US008500536B2

(12) United States Patent
Watkins et al.

(10) Patent No.: US 8,500,536 B2

(45) Date of Patent: Aug. 6, 2013

(54) SLOT MACHINE GAME WITH SELECTION BONUS GAME HAVING MODIFIER SYMBOLS

(75) Inventors: Brian A. Watkins, Austin, TX (US); Clint A. Owen, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 13/211,651

(22) Filed: Aug. 17, 2011

(65) Prior Publication Data

US 2013/0045792 A1 Feb. 21, 2013

(51) Int. Cl.
*A63F 9/24* (2006.01)
*A63F 13/00* (2006.01)

(52) U.S. Cl.
USPC .................. 463/16; 463/17; 463/18; 463/19; 463/20; 463/25; 463/31

(58) Field of Classification Search
USPC .......................................... 463/16–20, 25, 31
See application file for complete search history.

(56) References Cited

U.S. PATENT DOCUMENTS

| | | | | |
|---|---|---|---|---|
| 6,190,255 | B1 | 2/2001 | Thomas et al. | |
| 6,309,300 | B1 | 10/2001 | Glavich | |
| 6,322,309 | B1 | 11/2001 | Thomas et al. | |
| 6,609,971 | B2 | 8/2003 | Vancura | |
| 7,507,155 | B2 * | 3/2009 | Mead et al. | 463/16 |
| 7,566,271 | B2 | 7/2009 | Hostetler et al. | |
| 7,780,511 | B2 | 8/2010 | Casey et al. | |
| 2002/0151351 | A1 * | 10/2002 | Baerlocher et al. | 463/20 |
| 2004/0201169 | A1 * | 10/2004 | Schaefer et al. | 273/139 |
| 2008/0182664 | A1 * | 7/2008 | Kaplan et al. | 463/42 |

* cited by examiner

*Primary Examiner* — Arthur O. Hall
*Assistant Examiner* — Jasson Yoo
(74) *Attorney, Agent, or Firm* — Nathan H. Calvert, Esq.; Russell D. Culbertson, Esq.; JP Cody, Esq.

(57) ABSTRACT

A slot machine has a player selection bonus game where a player selects concealed gamepieces from a group to reveal the value of the gamepiece. The preferred game has a burger building theme in which the game rules are related to building one or more hamburgers, and the hidden gamepieces represent burger ingredients. A particular selection allows the player to win larger prizes for future selections. Other designated selections may modify future selections still further (2× and 3× multipliers for double-decker and triple-decker bun selections). Certain gamepieces may change their function based on the context or state of the bonus game.

18 Claims, 13 Drawing Sheets

SLOT MACHINE GAME WITH SELECTION BONUS GAME HAVING MODIFIER SYMBOLS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights.

TECHNICAL FIELD OF THE INVENTION

This invention relates to gaming systems and to gaming machines through which players may participate in wagering games. More particularly, the invention relates to methods for conducting an interactive reel or symbol array type wagering game including a selection bonus game in which modifier objects make persistent changes to selection values, launch extra games, and change states of the bonus game.

BACKGROUND OF THE INVENTION

Various slot machine games use selection bonus games to enhance the game experience for games with reels, simulated reels, or other arrays of gaming symbols. Selection bonus games generally provide a set of concealed options from which a player selects to reveal a prize or game element. What is needed are selection bonus games with more exciting feature and award variations, to increase player excitement and enjoyment of slot machine play.

SUMMARY OF THE INVENTION

The present invention includes a highly entertaining method of conducting a game for one or more players. The entertainment value is achieved partially by providing a slot machine game with a player selection bonus game in which a player selects concealed gamepieces from a group to reveal the value of the gamepiece or special properties of the gamepiece. The preferred game has a burger building theme in which the game rules are related to building one or more hamburgers, and the hidden gamepieces represent burger ingredients. A particular selection allows the player to win larger prizes for future selections (the bottom bun). Other designated selections may modify future selections still further (2× and 3× multipliers for double- and triple-decker bun selections). Still other designated selections (any additional bottom bun) may start an extra selection round after which the player returns to the current round, while it is still in progress.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving the selection bonus game.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the games presentation of the results received from the server in an entertaining manner. However, other embodiments of course might use a thin client architecture in which the animation is also conducted by the server and electronic gaming machines serve merely as a terminal to receive button or touch screen input from the player and to display graphics received from the server. Some systems may also employ an ultra-thin architecture, in which the gaming machine does not run a full operating system, and instead only sends inputs and displays video received from the server.

Different features may be included in different versions of the invention. For example, the selection bonus game may include multiple types of gamepieces that change the state of the bonus game to provide higher prizes for other gamepieces. Further, some gamepieces may change their function depending on the context or state of the game.

These and other advantages and features of the invention will be apparent from the following description of the preferred embodiments, considered along with the accompanying drawings.

DETAILED DESCRIPTION OF PREFERRED EMBODIMENTS

Figure 1A:
FIG. 1A is a game screen diagram of a base game outcome which triggers a player selection bonus game according to an example embodiment.

FIG. 1A shows an example of a game screen that is used to determine the start of the burger building bonus game. The game screen 1000 includes a matrix of symbol locations 1001, comprising nine reels 1002 with a single locations 1004 on each reel. Other reel arrangement may be used, such as, for example, three reels with three symbols, five reels with three symbols each, or fifteen uni-symbol reels, to name a few. The depicted game is a burger-themed game including burger or diner related graphic symbols at each symbol location 1006. In this embodiment a down-diagonal pattern is used to trigger the burger building bonus game, which trigger pattern consists of three burger building bonus symbols 1020 that are located as in a down-diagonal line as depicted on the reels. Other games may of course use other trigger patterns such as scatter patterns. The game screen 1000 also has an area with a prize feature explanation 1006. Below the prize feature explanation is a help/pays button 1018 that activates a display of the game paytable and play instructions, and a display of available credits 1012. Along the bottom of the matrix of symbol locations are a display of the wager amount per line 1011, a display of the current wager 1010, a display showing the current win 1014, a play button 1016, and a credit denomination indicator 1015. The display may also include common elements such as a message line used to inform the player of winnings, bonuses, and other important information.

Figure 1B:
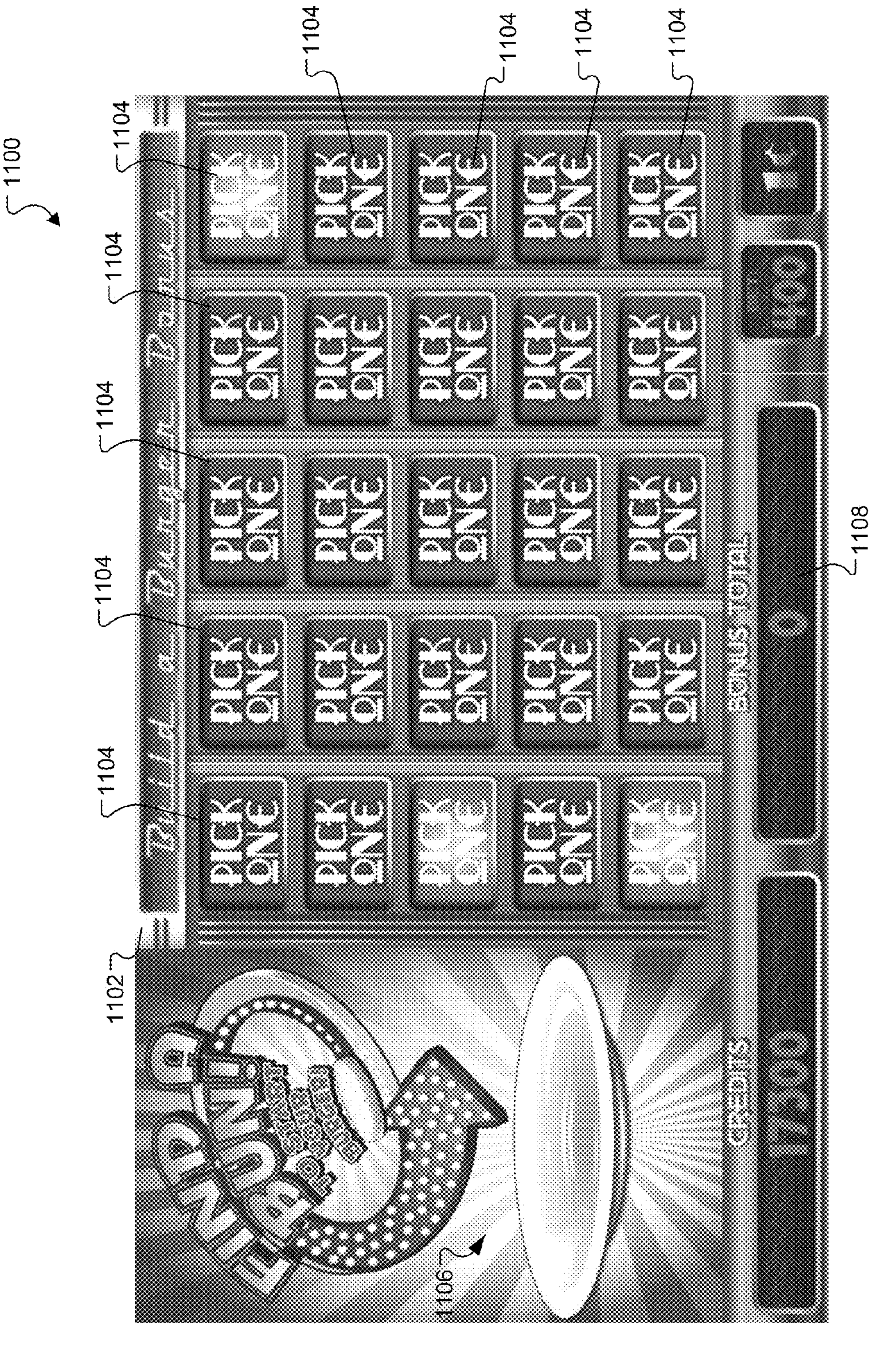
FIG. 1B is a game screen diagram of a player selection bonus game before any player selections have been made.

FIG. 1B shows the beginning of the burger building bonus game. In this embodiment the bonus game screen 1102 shows a matrix of selectable bonus symbol locations 1104 each concealing a gamepiece that may be applied in the bonus game. Here the matrix of bonus locations is in a 5×5 grid, however it is understood that the grid may have many other dimensions including 3×4, 4×5, 4×6, 5×6, and 6×6, to name but a few examples. The bonus game screen also has a burger building area 1106 to display the status of the burgers being constructed by gamepieces selected in the bonus game. The burger building area 1106 is shown as an empty plate until a burger bun is selected to begin construction of a burger, as will be further discussed below. There is a bonus score 1108 displayed below the matrix of bonus locations showing the total bonus points or credits accumulated so far in the bonus game. Three of the selectable symbol locations 1104 are shown as flashing to a brighter color, the flashing being moved around the matrix to other groups of three selectable objects from those objects remaining unselected, in order to depict excitement and urgency.

Figure 1C:
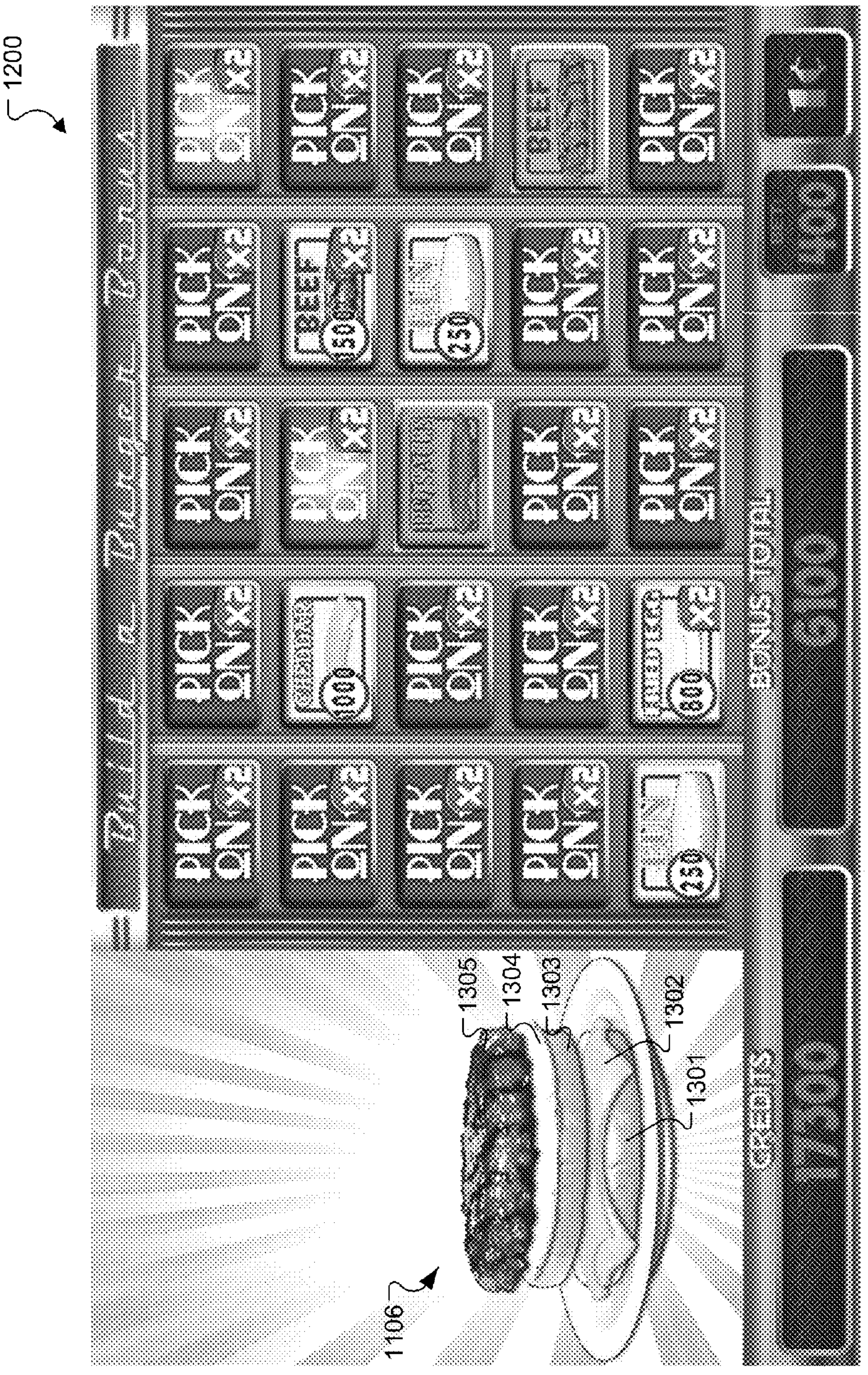
FIG. 1C is a screen diagram showing a burger building game in progress after the player has made several selections.

FIG. 1C is a screen diagram showing a burger building game in progress after the player has made several selections. To reach the depicted situation, the player has made several selections and uncovered two fixings before uncovering a bun. This can be seen on the depicted game screen diagram by the grayed-out shading on the Beef and BBQ Sauce gamepieces, indicating that they were selected before a bun was selected and were therefore discarded and not used in the hamburger.

After the two discarded selections, the player uncovered a first hamburger bun 1301, which changed the state of the game to provide increased point values for subsequently selected fixings. The bun is also shown as providing a 250 point score to the total. On top of the bottom bun 1301 is placed the player's next selection, the cheddar cheese gamepiece 1302, which is shown on the pick array as having a 1000 point value. Next in the depicted sequence, the player selected another bun gamepiece. Although the hamburger bun gamepieces are all identical in this embodiment, their function in the game depends on context and further on a determination based on a mystery random number or player selection input. In this example, the second selected bun gamepiece becomes a decker bun, or state changing gamepiece, which starts the second deck of the hamburger and causes a 2× multiplier to apply to subsequent gamepiece selections. This contextual process of applying the bun in the game is further described with regard to FIG. 2B. In preferred versions, when the bun is not the final bun available for selection in the array, a mystery selection or a second player pick game is employed to determine whether the second bun will be a decker bun (state changing gamepiece), or a top bun (group ending gamepiece). In the depicted scenario, the determination was made that the second bun selected is a decker bun, which adds the 2× multiplier to the remaining unselected gamepieces on the array.

Consequently, the subsequent selections made by the player are given a 2× multiplier to their depicted point values. The next selection is a fried egg gamepiece 1304 shown in the burger building area 1106 atop the decker bun 1303. After the fried egg, the player selected beef gamepiece 1305, which is added to the burger under construction. The beef gamepiece 1305 is also given a 2× multiplier as can be seen by its symbol on the array. From the depicted position, the game will continue until the player picks the final bun or any bun that is applied as a top bun.

Figure 2A:
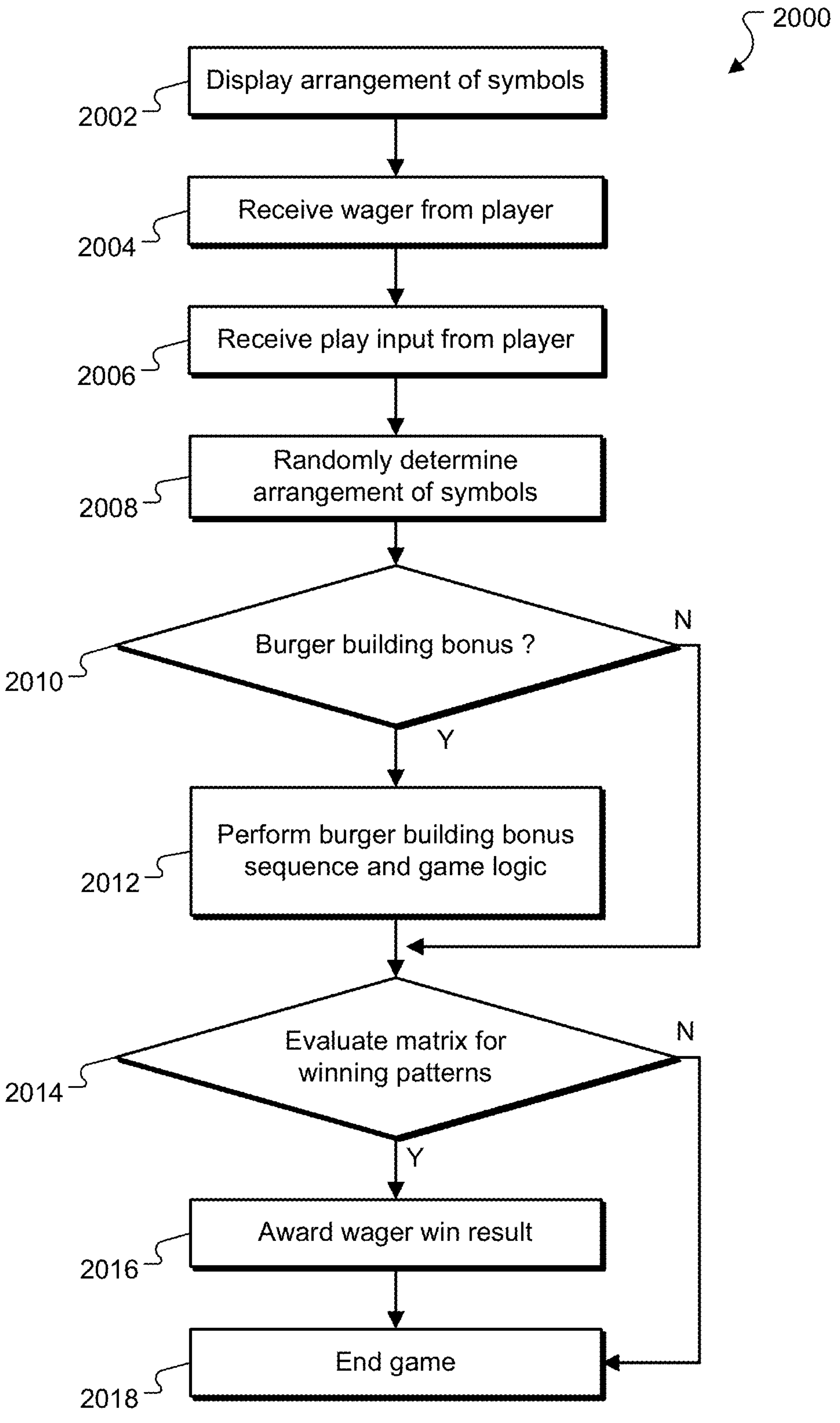
FIG. 2A is a flow chart showing an example game play process at a gaming machine that includes a burger building bonus sequence.

FIG. 2A is a flowchart showing the general process of game play for one example embodiment including the burger building bonus game. In this preferred embodiment, the flowchart 2000 starts at step 2002 where the process displays an arrangement of symbols. Then the process receives a wager from the player at step 2004 followed by step 2006 where the process receives a play input from the player. In step 2008 the process randomly selects an arrangement of symbols that are displayed in the symbol array to provide a base game result.

Once the arrangement of symbols is selected, the process evaluates the symbols in step 2010 to determine whether a burger building bonus game is initiated. In a preferred embodiment this is triggered by certain selected symbols appearing as a down diagonal pattern on the three reels, however it is understood that there are many ways that can be used to trigger the bonus round. For example, a three-to-five symbol scatter pattern may be used in a five real game with multiple positions per reel.

If a burger building bonus game is triggered, the process goes to step 2012 where it performs the burger building bonus game sequence and logic. If the process does not trigger the burger building bonus game in step 2010, then the process goes to step 2014 and evaluates the matrix of symbols for winning patterns. Although in this embodiment the process evaluates the matrix of symbols at step 2014, it should be noted that this step can be performed at many different locations in the process including before or during step 2010 where the grid is evaluated for burger building bonus games.

If the process determines in step 2014 that there are win results, then the process advances to step 2016 where it awards any win results, and concludes in step 2018 by ending the game. If the process determines in step 2014 that there are no win results, then the process advances directly to step 2018 and ends the game.

Figure 2B:
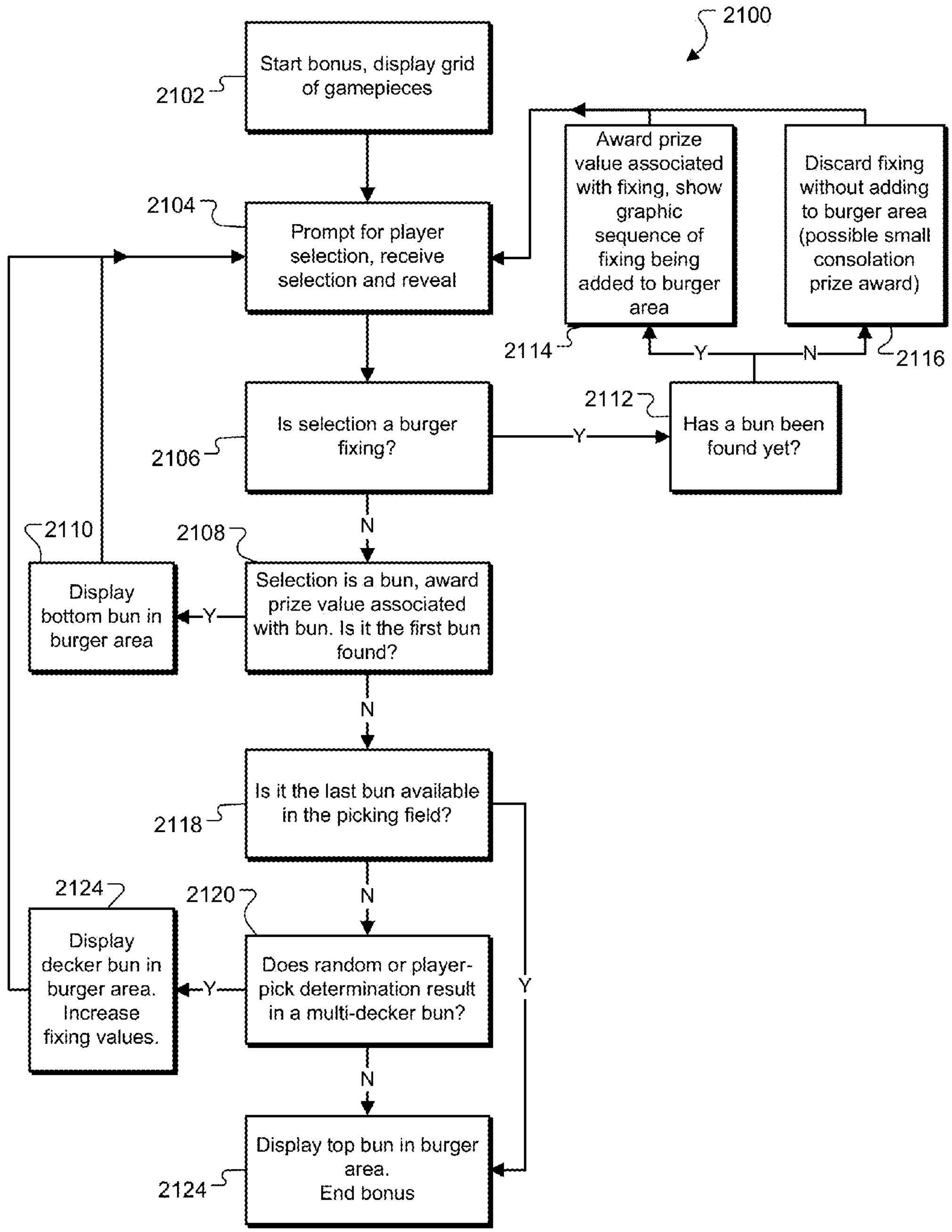
FIG. 2B is a flow chart showing an example process of implementing a burger building bonus sequence.

FIG. 2B is a flow chart showing an example preferred embodiment of a burger building bonus game sequence and logic, this embodiment accompanies the example gamescreens show in FIGS. 1B-1C. The depicted process 2100 starts at step 2102, where the process has already triggered the burger building bonus game, and displays a grid of selectable gamepieces such as that shown in FIG. 1B. Next, in step 2104, the process prompts the player to select an individual gamepiece from the plurality of concealed gamepieces, and reveals the selected gamepiece.

After revealing the gamepiece, the process in step 2106 determines if the gamepiece is an intermediate gamepiece type. In this embodiment, the intermediate game type is a burger fixing, which could be represented by any type of burger ingredient that goes between the buns.

If the process determines at step 2106 that the gamepiece is not a fixing, the process goes to step 2108, where it is determined that the selection is a bun. This determination is made because the only types of gamepieces available in this embodiment are fixings or hamburger buns. Other embodiments may have more types of gamepieces available for selection. Referring to step 2108, the selected bun is awarded a prize value associated with the bun. Also at this step, the process determines if this is the first bun, which determination may be made in some embodiments by checking a state of the game that is activated by finding a bun, or initiating type gamepiece. If this is the first bun selected in the current game round, the process goes to step 2110, where it adds the bun into the burger building display area. This step starts the building of a new burger, and changes the state of the game from a first state in which fixing ingredients are awarded no prize, or a small prize, to a second state in which the selected fixings are awarded valuable prize amounts in credits or other points associated with the identity of the fixing. After adding the bun to the burger building area and changing the state of the game at step 2110, the process goes back again to step 2104 where the player is prompted to make their next selection from the array of concealed gamepieces.

Referring again to step 2108, when a bun has been selected, and it is determined that this is not the first bun selected, the process goes to step 2118, where it determines if the currently selected bun is the final bun available for selection. If not, the process goes to step 2120 in which the selected bun type gamepiece is given a different function or value because of the context in which it is selected; that is, whether it is not the final bun. In this context, the process applies the bun gamepiece in the game by making a determination as to whether or not the bun will be applied in the game as a multi-decker bun, or state-changing type gamepiece. Such determination is made, in a preferred embodiment, by making a mystery selection which is accomplished by generating a hidden random number and applying that number to a group of preselected ranges to set the type for the gamepiece. If it is determined by the process at step 2120 that the bun is going to be applied as a state changing type gamepiece (or decker bun), then the process goes to step 2124. If, however, the process at step 2120 determines that the bun is not to be applied as a state change a gamepiece, the process goes to step 2124, where the bun is applied instead as the top bun which completes the building of the current burger and ends the current bonus round. While, in this embodiment, the determination at step 2120 is made through a mystery determination with a random number, other versions of the game may use other methods to make the selection such as, for example, presenting the player a separate pick screen in which the player makes a selection from two or more concealed results, which determines whether the bond will be applied as a decker bun or a top bun. Other embodiments may use still other methods to make such determination, such as, for example, reverse mapping a predetermined sequence of events in order to reverse map a randomly selected game outcome into a game presentation having the game logic discussed herein.

If the process determines that the gamepiece is a decker bun in step 2120, then in step 2124 the process enters the decker bun value to the ingredient list, and changes the fixing modifier state. This fixing modifier state adjusts the value of all future fixings added to the current group of ingredients being collected in the burger building area. In a preferred version, the first decker bun found causes a 2× modifier, and the second causes a 3× modifier. Then the process displays a graphic sequence of the decker bun being added to the burger before returning to step 2104 and prompts the player for another selection.

A different selection at step 2104 might select an intermediate type gamepiece, or hamburger fixing. If so, at 2106 the process determines that the gamepiece is a fixing instead of the bun, and goes to step 2112, where it determines if an initiating type gamepiece (hamburger bun) has been found yet in the current game. The bun is needed to start the burger building sequence. In this embodiment, if no bun has been selected to start the burger building sequence, the process goes from step 2112 to step 2116, where the fixing is discarded without being added to the burger building area shown on one of the gaming machines displays. In one embodiment, discarded fixings are given no value. In other embodiments, a small consolation value may be awarded when a fixing is discarded. If, at step 2112, a bun has already been found in the current burger building bonus game, the process goes to step 2114, where it awards a prize value associated with the fixing. This step also includes showing a graphic sequence of the fixing being added atop the bun to add the fixing to the hamburger being constructed.

The process next returns to step 2104, in which the player is again prompted to make a selection from the gamepieces. This repetition of gamepiece selection and applying the gamepiece to the bonus round using the depicted process is repeated until one of the rounds reaches step 2124, where an animation is displayed of the burger being completed with the top bun, and the collected point values for all of the ingredients of the burger are awarded with an associated credit value as the prize for the burger building bonus round.

Figure 2C:
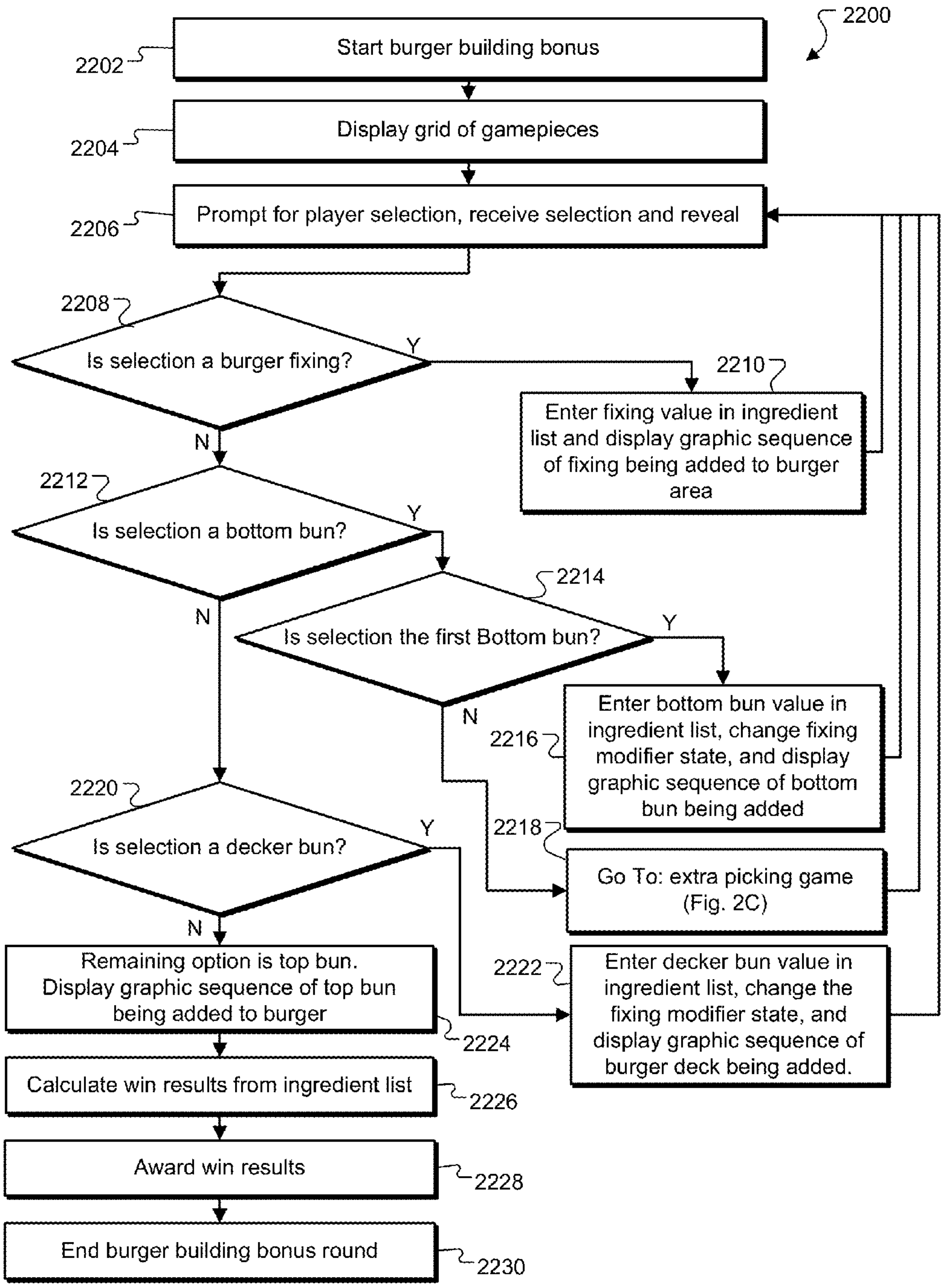
FIGS. 2C and 2D are two related flow charts according to another embodiment of a burger building bonus sequence, this embodiment including a second picking game.
Figure 2D:
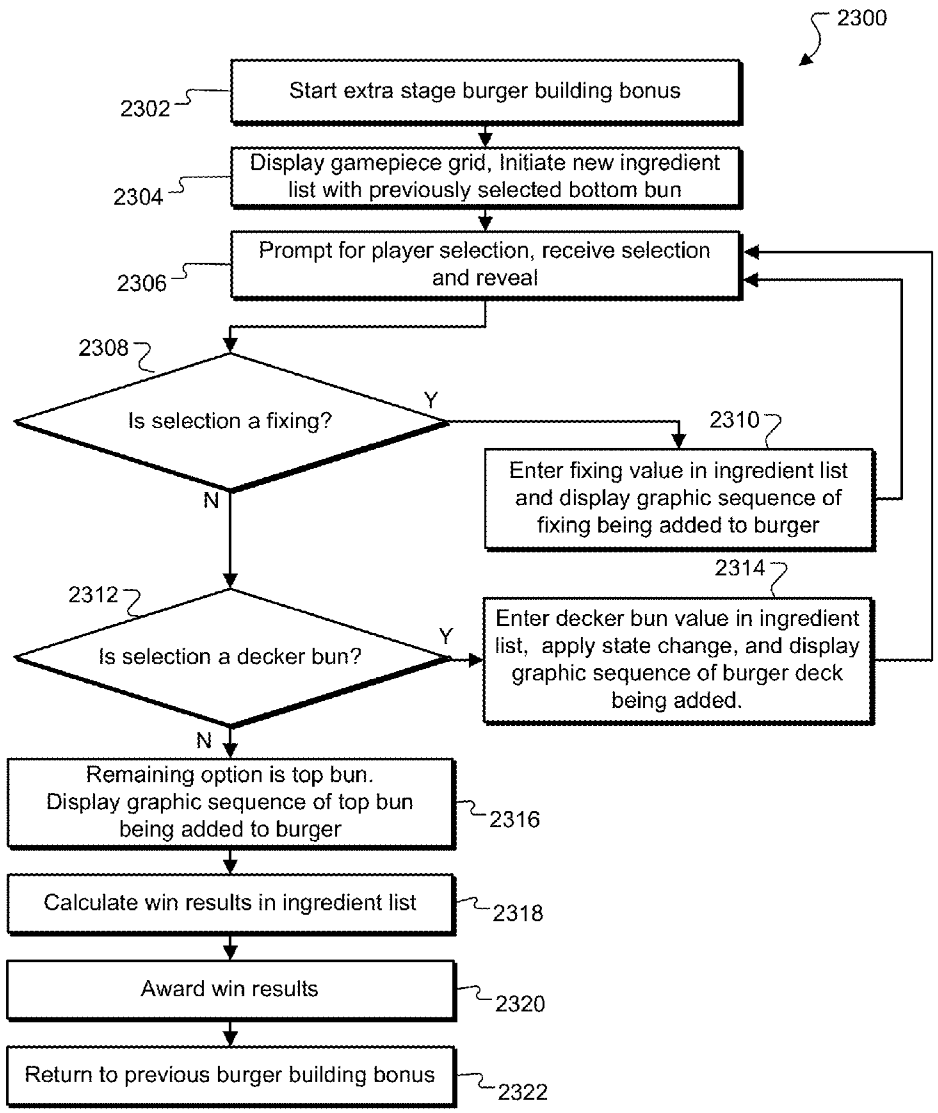

FIG. 2C is a flow chart showing another embodiment of the burger building bonus game sequence and logic, which may include an extra pick game of FIG. 2D in the bonus round. In this embodiment, there is more than one type of state changing gamepiece (decker buns). The flowchart 2200 begins at step 2202 where the process has already triggered the burger building bonus game. The process then goes to step 2204 where the grid of gamepieces is displayed. Next, in step 2206, the process prompts the player to select an individual gamepiece from the plurality of concealed gamepieces, and reveals the selected gamepiece.

After revealing the gamepiece, the process in step 2208 determines if the gamepiece is an intermediate gamepiece type. In this embodiment, the intermediate game type is a burger fixing, which could be represented by any type of burger ingredient that goes between the buns. In other embodiments, other suitable representations of intermediate things may be used such as the faces on a totem pole. If the process determines that the gamepiece is a fixing, the process in step 2210 enters the fixing value in the ingredient list and adds a value associated with the gamepiece to the group value of the current group of gamepieces. The value of the gamepiece is based at least in part on the identity of the gamepiece (for example bacon, lettuce, onion meat patty, etc.), and further based on a bonus game state that changes during the selection bonus game. Finally in step 2210 the process displays a graphic sequence of the fixing being added to the burger area and moves back to step 2206 where it prompts the player for another selection.

If the process determines that the gamepiece is not a fixing in step 2208, then the process goes to step 2212 where it determines if the gamepiece is an initiating type of gamepiece, which in this embodiment is a bottom bun. In other embodiments, other themes may use a different representation which could be anything associated initiating or starting a group of things.

If the process determines that the gamepiece is a bottom bun in step 2212 then the process moves to step 2214 where the process determines whether the gamepiece is the first bottom bun. If so, in step 2216 the process enters the gamepiece to the group and adds the value for the gamepiece to the ingredient list for the group and displays a graphic sequence of the bottom bun being added to the burger. The first bottom bun, or first initiating gamepiece, changes the state of the game so that fixings (intermediate gamepieces) now receive a modified higher value in points.

If the process determines that the bottom bun is not the first bottom bun to appear in the bonus game, then the process goes to step 2218 where it starts the extra picking game logic and sequence as described in FIG. 2D.

Referring back to step 2212, if the process determines that the gamepiece is not a bottom bun then the process moves to step 2220 where it determines whether the gamepiece is a state changing type of gamepiece, which, in this version is a hamburger decker bun. That is, represented by a bun that is neither a top bun nor a bottom bun, but a bun that goes between fixings to start another layer.

If the process determines that the gamepiece is a decker bun in step 2220, then in step 2222 the process enters the decker bun value to the ingredient list, and changes the fixing modifier state. This fixing modifier state adjusts the value of all future fixings added to the current group. In a preferred version the first decker bun found causes a 2× modifier, and the second causes a 3× modifier. Then the process displays a graphic sequence of the decker bun being added to the burger before returning to step 2206 and prompts the player for another selection.

If the process determines that the gamepiece is not a decker bun in step 2220 then the process goes to step 2224 where the only remaining value for the gamepiece is an ending type gamepiece, which in this embodiment is represented by a top bun. In step 2224 the process displays a graphic sequence of the top bun being added to the burger.

After the graphic sequence of the top bun being added to the burger from step 2224, the process moves to 2226 where the process calculates the win results from the ingredient list. It should be noted that in this embodiment, the winnings are calculated in step 2226, however that is not the only place winnings can be calculated, and other embodiments can calculate at other places in the process. After the winnings are calculated in step 2226, the process awards any win results in step 2228. Preferably, bonus game points are awarded as credits in a one-for-one value to the credits used in the base game. Finally in step 2230, the process ends the burger building bonus round.

FIG. 2D is a flowchart of an extra burger building bonus stage. The flowchart 2300 starts in step 2302 where the process has already revealed an additional bottom bun. Using this bun, or initiating type gamepiece, the process starts an extra stage burger building bonus with the game in the modified state by providing increased values for fixings. The process starts an extra stage burger building bonus. In this embodiment, there is a limitation allowing only one nested burger building bonus game, but it is also possible to have higher limits to the number of nested games. To limit the number of nested games, the process simply stops generating bottom buns in the secondary games.

Next, in step 2304, the process displays a new grid of concealed gamepieces and initiates a new ingredient list with the previously selected bottom bun. In step 2306, the process prompts the player for a selection, receives the player selection, and reveals the selected gamepiece.

Then, in step 2308, the process determines if the gamepiece is a fixing. If the gamepiece is a fixing, then the process advances to step 2310 where the process enters the fixing value to the ingredient list and displays a graphic sequence of the fixing being added to the burger before returning to step 2306 and prompting the player for a new selection.

If the process determines that the gamepiece is not a fixing in step 2308, then in step 2312 it determines if the gamepiece is a decker bun. If so, then the process at step 2314 enters the decker bun value in the ingredient list, applies the state change associated with the state changing gamepiece (decker bun). The process then displays a graphic sequence of the burger deck being added to the burger before returning to step 2306 and prompting the player for another selection.

If in step 2312 the process determines that the gamepiece is not a decker bun, then the gamepiece is a top bun, and the process displays a graphic sequence of the top bun being added to the hamburger in step 2316. The top bun is an embodiment of a group ending type of gamepiece. Other versions may employ other representations of a group ending gamepiece, such as a house roof, a convertible car top, or any other suitable representation of a piece that completes construction of something.

After step 2316, the process calculates the win results from the ingredient list in step 2318, awards any win results in step 2320, and returns to the previous burger building bonus game in step 2322.

Figure 2E:
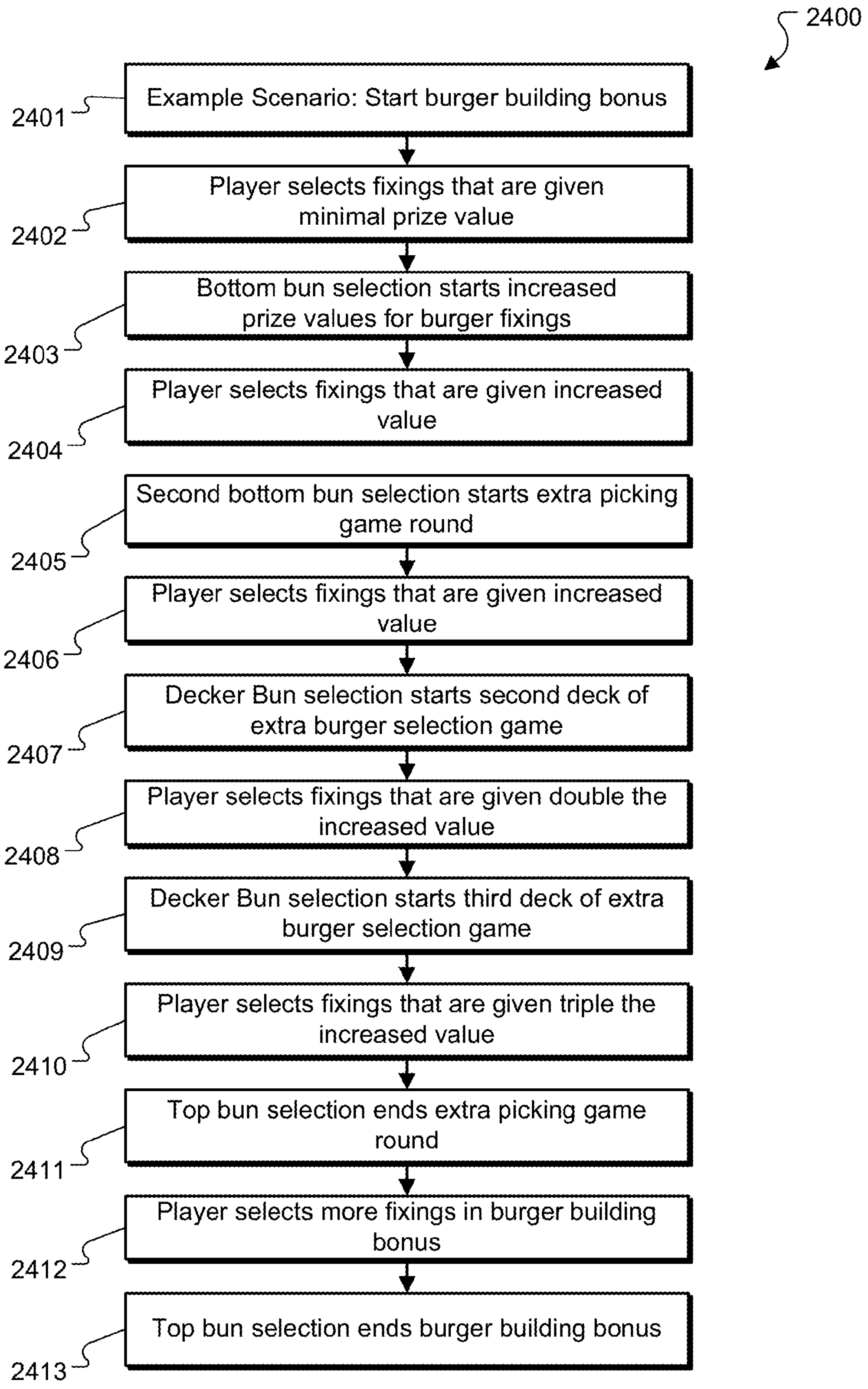
FIG. 2E is a flow chart showing an example game play process, this example showing multiple decker buns in a burger building bonus sequence.

FIG. 2E is flow chart showing an example scenario of play for a bonus game leading to a second bonus game. The second bonus game shows an example of multiple deckers being used during the burger building bonus game. This scenario is merely one instance of a player proceeding through the bonus game to illustrate the extra bonus game and the state changing effect of the decker buns. The scenario 2400 starts in step 2401 where the burger building bonus game is started. In this example, the player starts by selecting fixings that have minimal prize value in step 2402. However in step 2403, the player has selected a bottom bun that starts increased values for future burger fixings. Now, the player, in step 2404, selects fixings that receive a higher value due to the bottom bun from step 2403. This value is based at least in part on the identity of the fixing.

Next, in step 2405, the player selects a second bottom bun that starts an extra picking round of the burger building bonus game. The fixings that the player selects in step 2406 receive a higher value due to the bottom bun that the player selected in step 2405. The player gets lucky in step 2407, where the player selects a decker bun that initiates a second deck of the extra burger building bonus game. This causes the fixings that the player selects in step 2408 to receive double the increased value.

In step 2409, the player selects an additional decker bun that initiates a third deck of the extra burger building bonus game. This causes the fixings that the player selects in step 2410 to receive triple the increased value.

Then in step 2411, the player selects a top burger that ends the extra burger building bonus round and returns the player to the burger building bonus game where they were before selecting the bottom bun in step 2405. Now the fixings selected by the player in step 2412 only receive an additional value conferred by the original bottom bun the player selected in step 2403. Finally in step 2413, the player unfortunately selects a second top bun that ends the burger building bonus round.

It should be understood that in this example scenario of play is shown to illustrate how a bonus game might proceed. The actual progress of any particular bonus game is of course determined by the selections made during the bonus rounds, which are randomly generated or reversed-mapped from a randomly determined outcome and therefore vary accordingly.

Figure 2F:
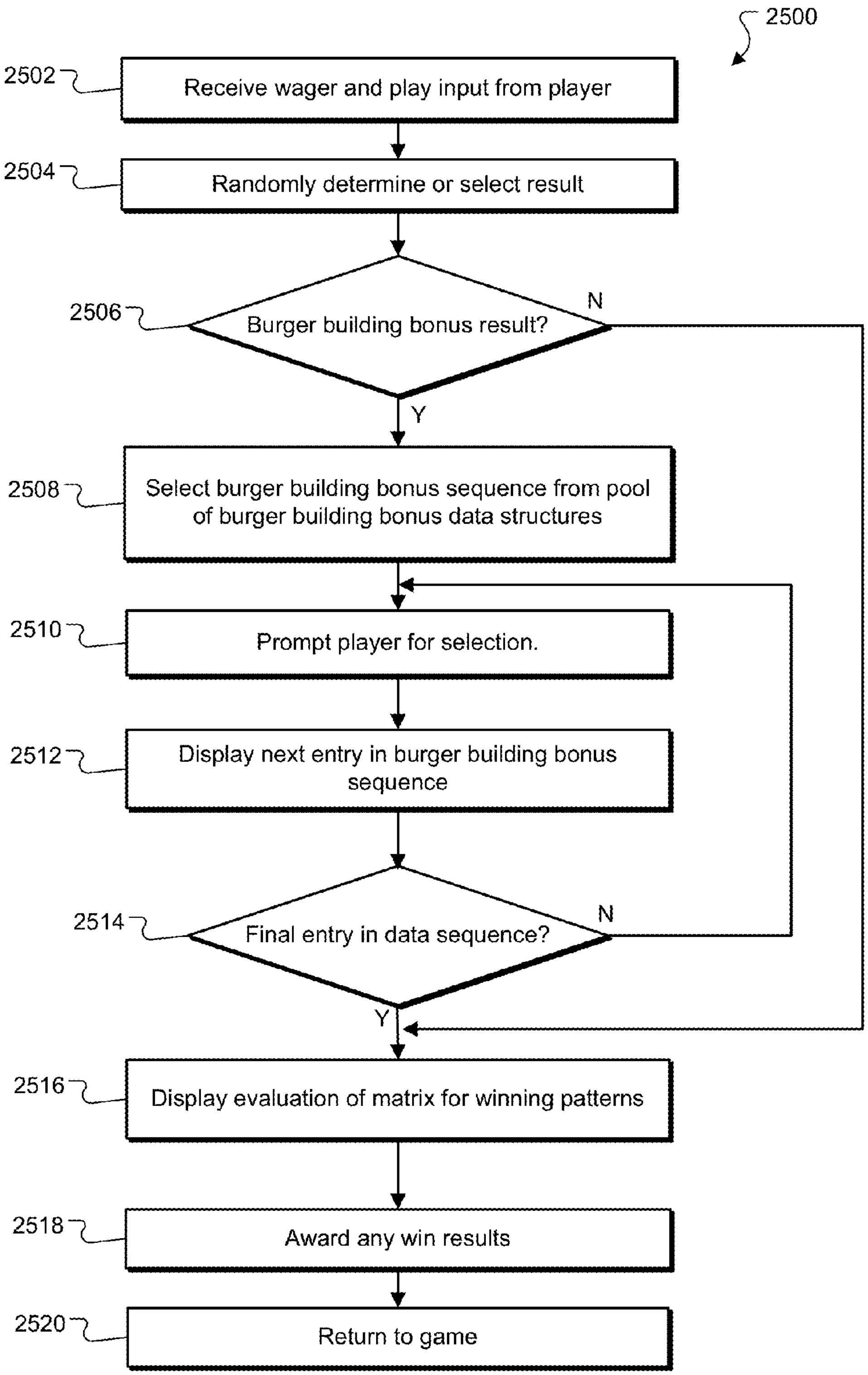
FIG. 2F is a flow chart showing another example game play process, this example including reverse-mapping of game results to a set of predetermined burger building bonus sequences.

FIG. 2F is a flow chart showing an example of game play where the game results are reversed-mapped to a set of predetermined burger building bonus symbol sequences. This embodiment uses a Class II bingo game engine to produce outcomes and selects a scripted game presentation that matches the predetermined outcome. These Class II bingo game results are advantageous in certain gaming jurisdictions where they are operable with reduced regulatory and tax requirements.

In this embodiment, the flowchart 2500 starts at step 2502 where the process receives a wager and a play input from the player. After the play input has been received, the process advances to step 2504 where a previously generated result is randomly selected, or a Class II type is generated, for example, by entering bingo cards in an electronic bingo game. Next, in step 2506, the process determines if the selected result includes a burger building bonus round. If the process finds that the selected result calls for a burger building bonus round, then in step 2508 the process selects a burger building sequence from a pool of burger building bonus data structures that matches the selected result. The selected process is typically based on the prize required to be provided from the base round. That prize value is used to select from a group of bonus round presentations that deliver the required prize. Selection from the group may be made in order if the group was already in a randomized order, or by a random selection from a group using a random number addition to the prize value to select the sequence. Preferably, each data structure contains an entertaining sequence of selections to present the prize to the player as if their selections were actually determining the result of each step. Each sequence is defined by the burger building bonus data structure which includes some index or identifier, the prize amount provided, and, in order, the selections that will be presented to the player each time they choose an option from the grid of concealed gamepieces. That is, the data structure contains identifiers for multiple gamepieces and some explicit or inherent way to determine the order in which the pieces appear. This is preferably done by listing the pieces in the order used.

Now that the process has a burger building data structure, describing a bonus sequence from the pool of burger building data structures, the process then prompts the player for a selection in step 2510. When the player makes a selection, the process moves to step 2512 and displays the next available value in the burger building sequence. It should be noted that if this is the first time a selection is being made by the player, then the next available value in the burger building sequence is the first value in the burger building sequence. After displaying the entry in the burger building sequence, then the process checks in step 2514 whether the value is a final entry in the burger building sequence. The final entry in the burger building sequence will be a top bun. If the entry displayed in step 2512 is not a final entry in the burger building bonus sequence, then the process returns to step 2510 and prompts the player for the next selection.

If the process determines in step 2514 that the value displayed in step 2512 is the final entry in the data sequence the process moves to step 2516 and displays an evaluation of the matrix for any winning patterns. It should be noted that the process will also move to step 2516 from step 2506 if the process determines that no burger building bonus round is called for.

After step 2516, where the process has determined any winning patterns, the process advances to step 2518 where the process awards any winnings and concludes in step 2520 by returning to the game.

Figure 3A:
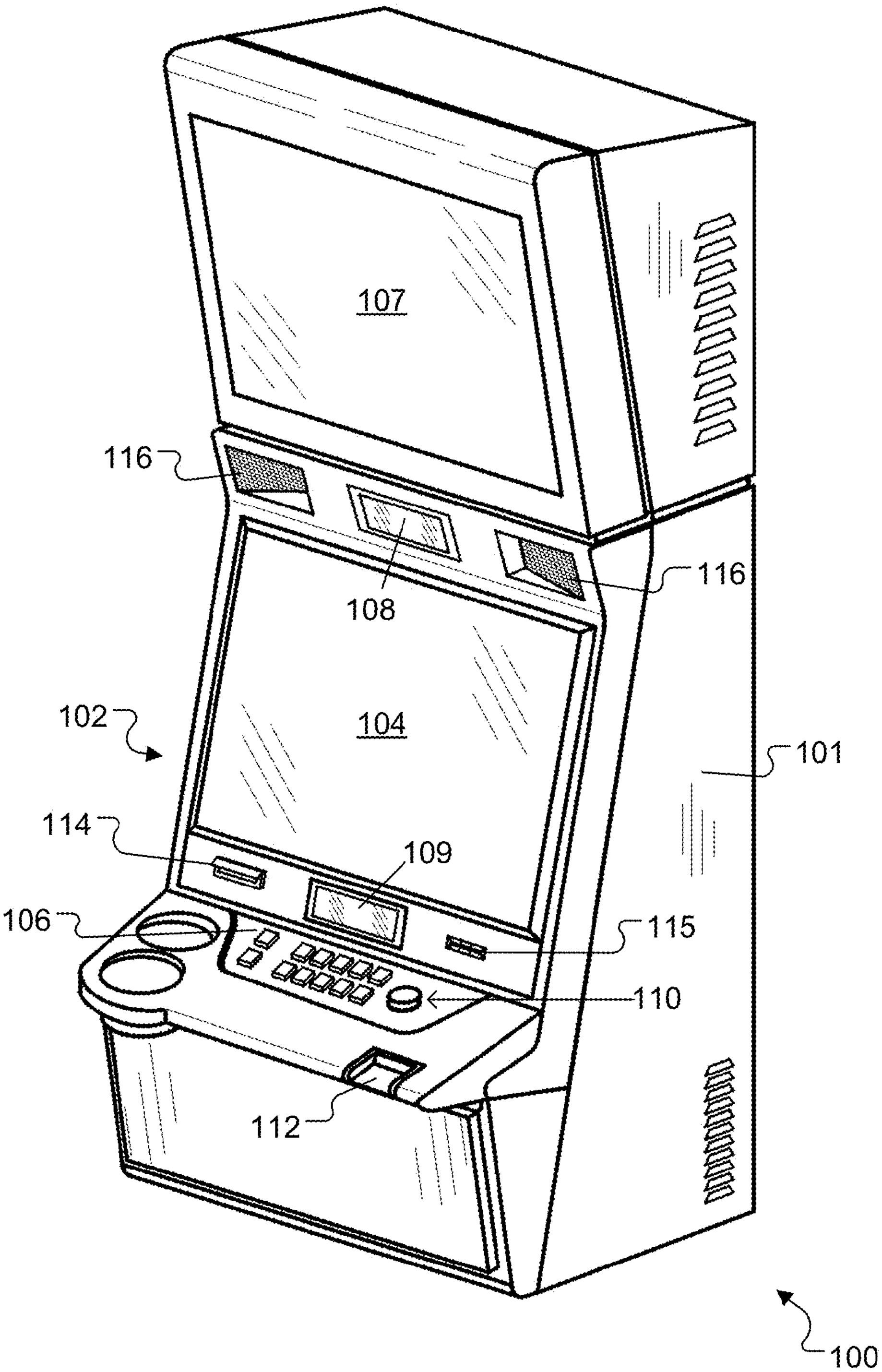
FIG. 3A is a front perspective view of a gaming machine which may be used in a gaming system embodying the principles of the present invention.
Figure 3B:
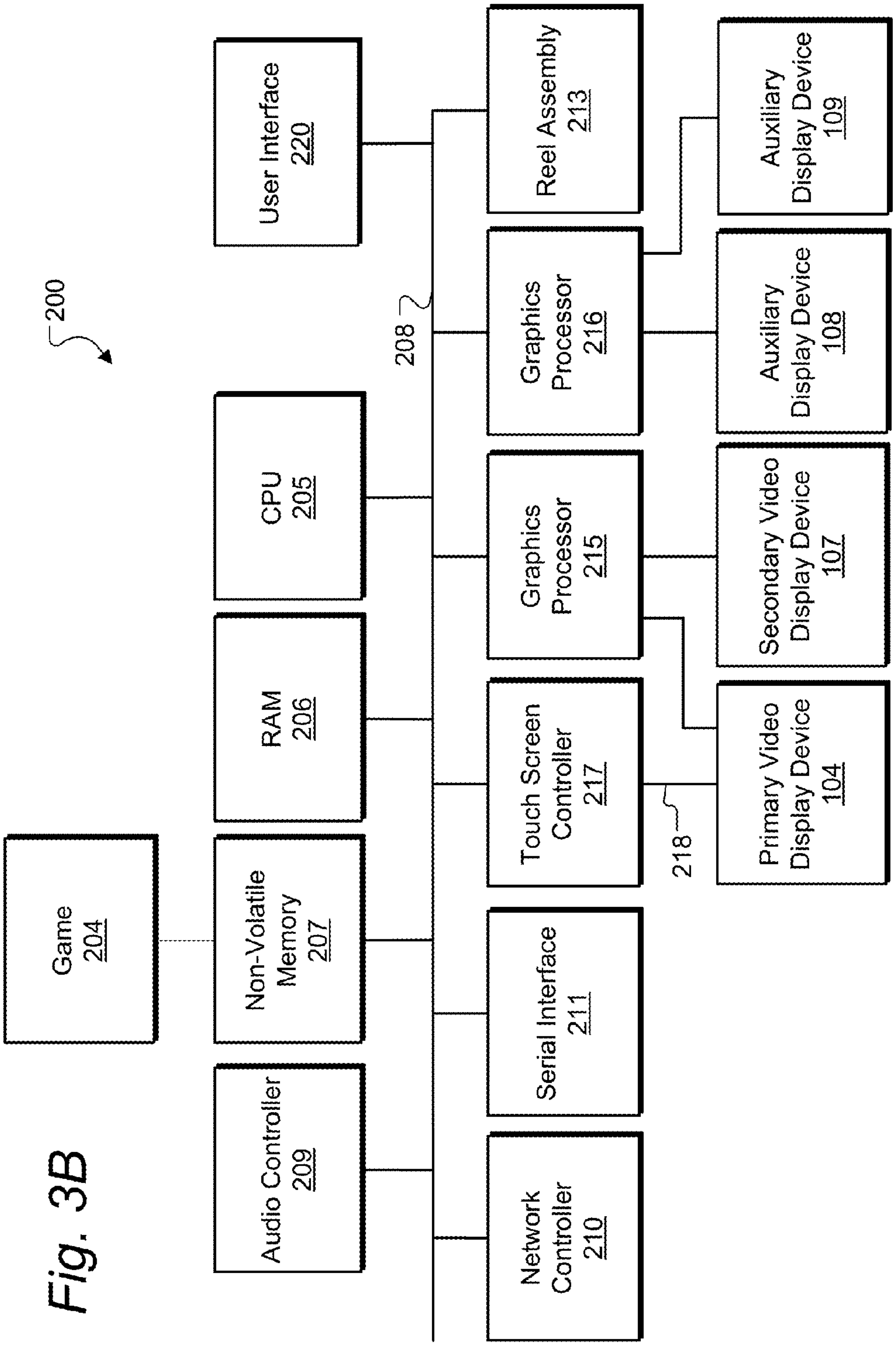
FIG. 3B is a block diagram showing various electronic components of the gaming machine shown in FIG. 3A together with additional gaming system components.

FIG. 3A shows a gaming machine 100 that may be used to implement a burger building bonus game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108, and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio interface device 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio interface 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the burger building ingredient graphics may be displayed on secondary video display 107 rather than beside the array of selectable gamepieces on the primary display. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of a burger building bonus game according to the present invention. CPU 205 also executes software related to communications handled through network controller 210, and software related to various peripheral devices such as those connected to the system through audio interface 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the burger building bonus game as will be discussed below in connection with FIG. 3.

It should be noted that the invention is not limited to gaming machines employing the personal computer-type arrangement of processing devices and interfaces shown in example gaming machine 100. Other gaming machines through which a burger building bonus game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a burger building bonus game within the scope of the present invention using an electro mechanical arrangement or even a purely mechanical arrangement for displaying the symbols needed to complete the burger building bonus game as described herein. However, the most preferred forms of the invention utilize one or more video display devices for displaying the spinning reels, the accumulated symbols, and the modifier bonus game. For example, a gaming machine suitable for providing a burger building bonus game may include a mechanical reel-type display rather than a video-type display device for displaying results in a primary game, and include a video display device for presenting the burger building bonus game separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Figure 4A:
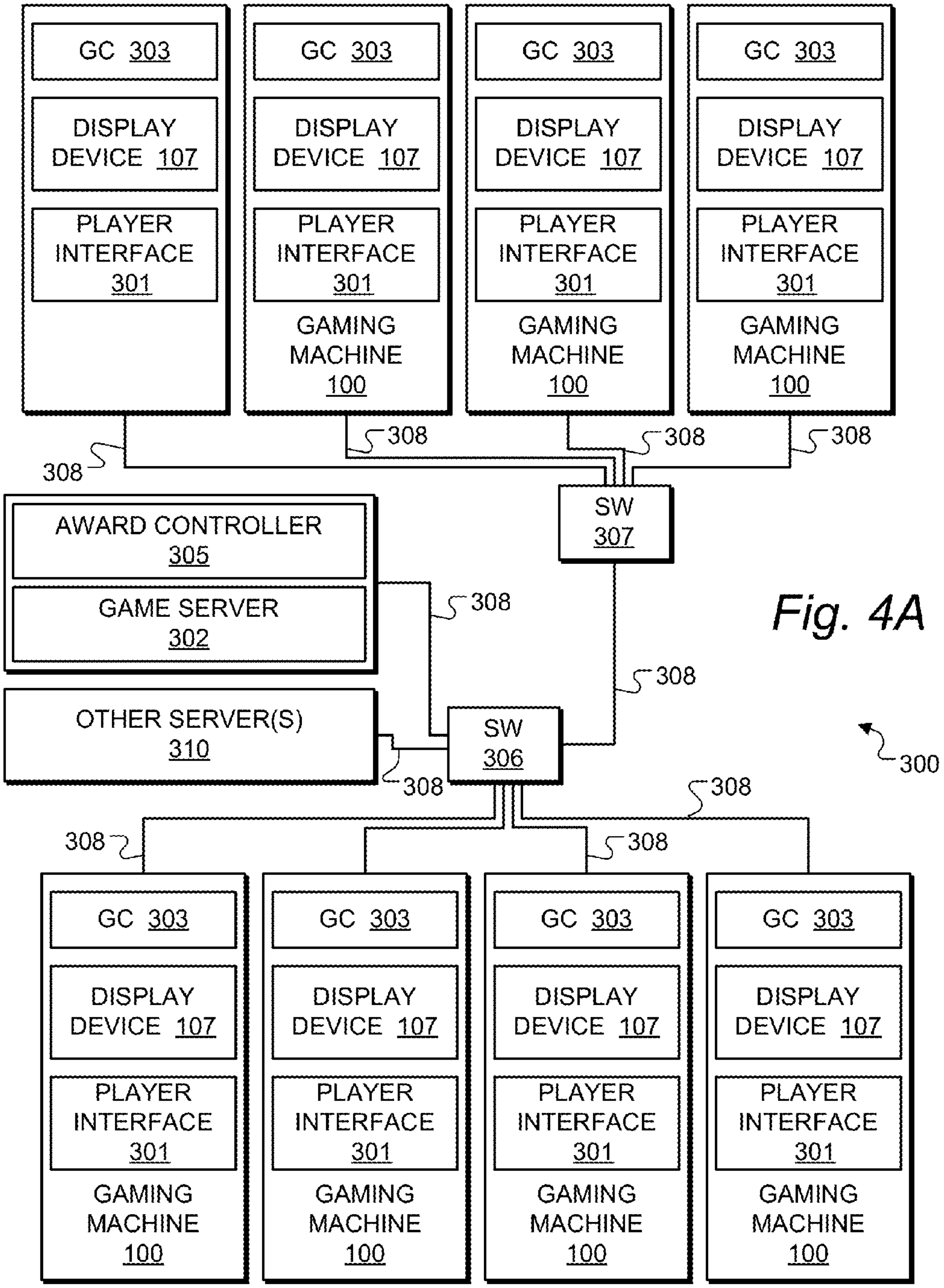
FIG. 4A is a system block diagram of a gaming system according to one embodiment of the present invention.
Figure 4B:
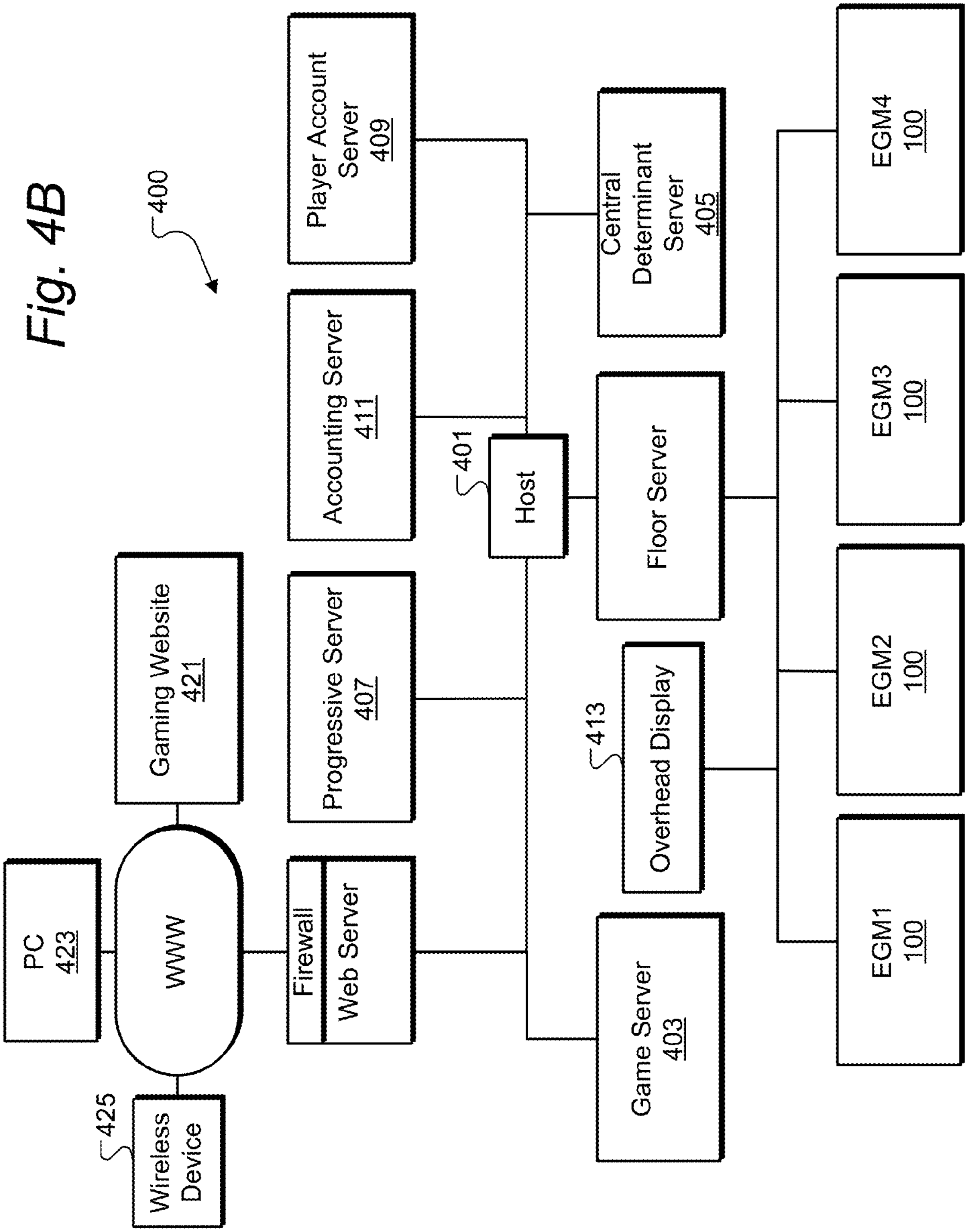
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determination server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touch screen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A these two components, game server 302 and the game client components 303 combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a burger building bonus game, and make selections of any selectable objects displayed at the respective gaming machine in the course of the burger building bonus game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a burger building bonus game at the respective gaming machine.

The game control arrangement made up of game server 302 and the respective game client 303 at a given gaming machine functions to control the respective video display device 107 for that gaming machine to display the modifier bonus game with the selectable objects. Award controller 305 is responsible for awarding prizes for a player's participation in a burger building bonus game, and maintaining progressive prize information where the burger building bonus game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the burger building bonus game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing burger building bonus games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections, and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of providing a wagering game for a player, the game conducted under control of one or more electronic processors and including an electronic display of a matrix of symbol locations including a plurality of symbol locations, the method comprising:

under control of the one or more electronic processors, performing the following steps:

(a) in response to receiving a game play input from the player, randomly or pseudo-randomly determining a base game result;

(b) determining, based on the base game result, that a selection bonus game is to be applied;

(c) conducting a selection bonus game including receiving player selection inputs to select individual gamepieces from a plurality of concealed gamepieces, and in response to each selected gamepiece taking one of the following actions based on a designated type associated with the selected gamepiece:

(i) if the selected gamepiece has an initiating type and the initiating type is appearing for the first time in the selection bonus game, starting a first group of gamepieces and a first bonus game round, entering the selected gamepiece in the first group, and adding a value for the selected gamepiece to a group value for the first group; if the selected gamepiece has an initiating type but it is not appearing for the first time in the selection bonus game, starting an additional group of gamepieces in an additional bonus game round, and adding a value for the selected gamepiece to a group value associated with the additional group in the additional bonus game round, leaving the first group in its condition when the selected gamepiece was selected, and moving the bonus game focus to the additional group in the additional bonus game round;

(ii) if the selected gamepiece has an intermediate type, and a group started by an initiating type already exists, entering the selected gamepiece in the group of gamepieces in the current round and adding a value associated with the selected gamepiece to the group value of the group of gamepieces in the current round, the value based at least in part on an identity of the selected gamepiece and a bonus game state, wherein the bonus game state reflects one or more conditions of the current bonus game round;

(iii) if the selected gamepiece has a state-changing type, and a group started by an initiating type already exists, changing the bonus game state to increase a value of all future intermediate type gamepieces selected in the group of gamepieces in the current round, adding the selected gamepiece to the group of gamepieces in the current round, and adding a value for the selected gamepiece to the group value for the group of gamepieces in the current round; and (iv) if the selected gamepiece has a group ending type, and a group started by an initiating type already exists, adding the selected gamepiece to the group of gamepieces in the current round, adding a value for the selected gamepiece to the group value for the group of gamepieces in the current round, concluding the bonus game round currently being conducted, and if the bonus game round currently being conducted was an additional bonus game round, returning to the bonus game round being conducted previously, in the condition in which it was left.

2. The method of claim 1, wherein the gamepiece type is determined after selection by the player for non-intermediate type gamepieces, and determined based at least in part on the bonus game state.

3. The method of claim 2, wherein the gamepiece type is further determined based at least in part on a random determination or player selection input.

4. The method of claim 1, wherein the selection bonus game further comprises a graphical theme of building a hamburger, the initiating type of gamepiece is represented by a hamburger bottom bun, the intermediate type of gamepiece is represented by a graphical depiction of one of a set of hamburger ingredients for placement between hamburger buns, the state-changing type is represented by a hamburger decker bun, and the group ending type is represented by a hamburger top bun.

5. The method of claim 4, in which the set of hamburger ingredients can be changed to a set of vegetarian hamburger ingredients.

6. The method of claim 1, wherein the step of changing the bonus game state if the selected gamepiece has the state-changing type further comprises if the selected gamepiece is the first gamepiece having the state-changing type to appear in the current round, the state change is a 2× value multiplier, and if the selected gamepiece is the second gamepiece having the state-changing type to appear in the current round, the state change is a 3× value multiplier.

7. The method of claim 1, in which the step of starting an additional bonus game round if the selected gamepiece is not the first initiating type gamepiece to appear in the current round is allowed to occur when the current round is in a secondary burger building bonus game round.

8. A system for providing a wagering game for a player, the system comprising:

an electronic gaming machine including an input device and at least one server interacting with the gaming machine over a network, the system programmed to perform the following steps using one or more processors under control of executable code:

(a) in response to receiving a game play input from the player on the input device, randomly or pseudo-randomly determining a base game result with a processor;

(b) determining, based on the base game result, that a selection bonus game is to be applied;

(c) conducting a selection bonus game including receiving player selection inputs to select individual gamepieces from a plurality of concealed gamepieces, and in response to each selected gamepiece taking one of the following actions based on a designated type associated with the selected gamepiece:

(i) if the selected gamepiece has an initiating type and the initiating type is appearing for the first time in the selection bonus game, starting a first group of gamepieces and a first bonus game round, entering the selected gamepiece in the first group, and adding a value for the selected gamepiece to a group value for the first group; if the selected gamepiece has an initiating type but it is not appearing for the first time in the selection bonus game, starting an additional group of gamepieces in an additional bonus game round, and adding a value for the selected gamepiece to a group value associated with the additional group in the additional bonus game round, leaving the first group in its condition when the selected type gamepiece was selected, and moving the bonus game focus to the additional group in the additional bonus game round;

(ii) if the selected gamepiece has an intermediate type, and a group started by an initiating type already exists, entering the selected gamepiece in the group of gamepieces in the current round and adding a value associated with the selected gamepiece to the group value of the group of gamepieces in the current round, the value based at least in part on an identity of the selected gamepiece and a bonus game state, wherein the bonus game state reflects one or more conditions of the current bonus game round;

(iii) if the selected gamepiece has a state-changing type, and a group started by an initiating type already exists, changing the bonus game state to increase a value of all future intermediate type gamepieces selected in the group of gamepieces in the current round, adding the selected gamepiece to the group of gamepieces in the current round, and adding a value for the selected gamepiece to the group value for the group of gamepieces in the current round; and (iv) if the selected gamepiece has a group ending type, and a group started by an initiating type already exists, adding the selected gamepiece to the group of gamepieces in the current round, adding a value for the selected gamepiece to the group value for the group of gamepieces in the current round, concluding the bonus game round currently being conducted, and if the bonus game round currently being conducted was an additional bonus game round, returning to the bonus game round being conducted previously, in the condition in which it was left.

9. The system of claim 8, wherein the selection bonus game further comprises a graphical theme of building a hamburger, the initiating type of gamepiece is represented by a hamburger bottom bun, the intermediate type of gamepiece is represented by a graphical depiction of one of a limited number of hamburger ingredients for placement between hamburger buns, the state-changing type is represented by a hamburger decker bun, and the group ending type is represented by a hamburger top bun.

10. The system of claim 9, in which the selection bonus game round currently being conducted is represented as a hamburger in the process of being assembled, the representation occurring in a bonus graphics area separate from the plurality of concealed gamepieces, and wherein each time a gamepiece is added to the group of gamepieces in the current round, an animation is shown depicting an associated hamburger ingredient representing the gamepiece to be added to the hamburger in the bonus graphics area.

11. The system of claim 8, wherein the state-changing type of gamepiece is only available for selection in the additional bonus game round.

12. The system of claim 8, wherein the step of changing the bonus game state if the selected gamepiece has the state-changing type further comprises if the selected gamepiece is the first appearance of a gamepiece of state-changing type in the group of gamepieces in the current round, the state change is a 2× value multiplier, and if the selected gamepiece is the second appearance of a gamepiece of state-changing type in the current round, the state change is a 3× value multiplier.

13. A non-transitory computer readable medium, including code executable by a gaming machine and at least one gaming server, the code including instructions to:

(a) in response to receiving a game play input from a player, randomly or pseudo-randomly determining a base game result;

(b) determining, based on the base game result, that a selection bonus game is to be applied;

(c) conducting a selection bonus game including receiving player selection inputs to select individual gamepieces from a plurality of concealed gamepieces, and in response to each selected gamepiece taking one of the following actions based on a designated type associated with the selected gamepiece:

(i) if the selected gamepiece has an initiating type and the initiating type is appearing for the first time in the selection bonus game, starting a first group of gamepieces and a first bonus game round, entering the selected gamepiece in the first group, and adding a value for the selected gamepiece to a group value for the first group; if the selected gamepiece has an initiating type but it is not appearing for the first time in the selection bonus game, starting an additional group of gamepieces in an additional bonus game round, and adding a value for the selected gamepiece to a group value associated with the additional group in the additional bonus game round, leaving the first group in its condition when the selected gamepiece was selected, and moving the bonus game focus to the additional group in the additional bonus game round;

(ii) if the selected gamepiece has an intermediate type, and a group started by an initiating type already exists, entering the selected gamepiece in the group of gamepieces in the current round and adding a value associated with the selected gamepiece to the group value of the group of gamepieces in the current round, the value based at least in part on an identity of the selected gamepiece and a bonus game state, wherein the bonus game state reflects one or more conditions of the current bonus game round;

(iii) if the selected gamepiece has a state-changing type, and a group started by an initiating type already exists, changing the bonus game state to increase a value of all future intermediate type gamepieces selected in the group of gamepieces in the current round, adding the selected gamepiece to the group of gamepieces in the current round, and adding a value for the selected gamepiece to the group value for the group of gamepieces in the current round; and (iv) if the selected gamepiece has a group ending type, and a group started by an initiating type already exists, adding the selected gamepiece to the group of gamepieces in the current round, adding a value for the selected gamepiece to the group value for the group of gamepieces in the current round, concluding the bonus game round currently being conducted, and if the bonus game round currently being conducted was an additional bonus game round, returning to the bonus game round being conducted previously, in the condition in which it was left.

14. The non-transitory computer readable medium of claim 13, wherein the selection bonus game further comprises a graphical theme of building a hamburger, the initiating type of gamepiece is represented by a hamburger bottom bun, the intermediate type of gamepiece is represented by a graphical depiction of one of a set of hamburger ingredients for placement between hamburger buns, the state-changing type is represented by a hamburger decker bun, and the group ending type is represented by a hamburger top bun.

15. The non-transitory computer readable medium of claim 14, in which the selection bonus game round currently being conducted is represented as a hamburger in the process of being assembled, the representation occurring in a bonus graphics area separate from the plurality of concealed gamepieces, and wherein each time a gamepiece is added to the group of gamepieces in the current round, an animation is shown depicting an associated hamburger ingredient representing the gamepiece to be added to the hamburger in the bonus graphics area.

16. The non-transitory computer readable medium of claim 13, wherein the state-changing type of gamepiece is only available for selection in the additional bonus game round.

17. The non-transitory computer readable medium of claim 13, wherein the step of changing the bonus game state if the selected gamepiece has the state-changing type further comprises if the selected gamepiece is the first appearance of a gamepiece of state-changing type in the group of gamepieces in the current round, the state change is a 2× value multiplier, and if the selected gamepiece is the second appearance of a gamepiece of state-changing type in the current round, the state change is a 3× value multiplier.

18. The non-transitory computer readable medium of claim 13, in which the step of starting an additional bonus game round if the selected gamepiece is not the first initiating type gamepiece to appear in the current round is allowed to occur when the current round is in a secondary burger building bonus game round.

* * * * *